No. 884,930. PATENTED APR. 14, 1908.
E. W. JUNGNER.
ELECTRODE FOR REVERSIBLE GALVANIC BATTERIES.
APPLICATION FILED SEPT. 20, 1904.
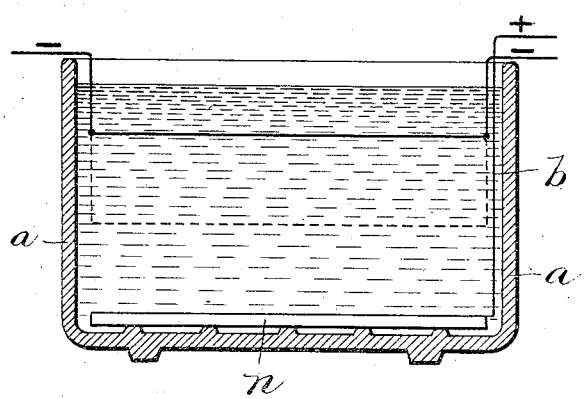
Witnesses.
Harry L. Amer.
B. Rommers
Inventor.
Ernst Waldemar Jungner
by Henry Orth Son
attys.

UNITED STATES PATENT OFFICE.

ERNST WALDEMAR JUNGNER, OF KNEIPPBADEN, NORRKÖPING, SWEDEN, ASSIGNOR TO NYA ACKUMULATOR-AKTIEBOLAGET JUNGNER, OF STOCKHOLM, SWEDEN, A COMPANY.

ELECTRODE FOR REVERSIBLE GALVANIC BATTERIES.

No. 884,930.  Specification of Letters Patent.  Patented April 14, 1908.

Application filed September 20, 1904. Serial No. 225,235.

*To all whom it may concern:*

Be it known that I, ERNST WALDEMAR JUNGNER, a subject of the King of Sweden, residing at Kneippbaden, Norrköping, Sweden, have invented certain new and useful Improvements in Electrodes for Reversible Galvanic Batteries; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

It is well known that in accumulators employing an electrolyte, which remains unchanged during all conditions of working nonconductive or very badly conductive metallic oxids are used, for instance oxids of mercury, copper, nickel, cobalt, iron, manganese, cadmium, bismuth, etc. or also the hydrates of these metals. Experiments have been made to make these oxids or hydrates conductive by mixing them with graphite. Then, of course, graphite is used in its natural occurrence, *i. e.* as crystalline graphite, which, when pulverized, will break up into flakes or scales. In consequence of their purity and form these flakes are more conductive and have greater power of resistance against oxygen *in statu nascenti*, when subjected to electrolysis in alkali, than graphite in the form of small grains. It is, however, impossible, even with such graphite, to give the active mass a sufficient conductivity. Thus, for instance, peroxid of lead as well as spongy lead have a conductivity that is many times greater than a mixture of crystalline graphite and a non-conductive metallic oxid.

The greatest inconvenience in accumulators with invariable electrolyte is, without doubt, the great electric resistance in the active masses, and the present invention has for its object the remedying of this inconvenience, totally or partly. The invention consists of a galvanoplastic coating of the graphite crystals with a thin sheet of some metal that is indifferent in the electrolyte, such as nickel for instance.

It is well known that the metals generally have a considerably greater conductivity than conductive kinds of carbon, and thus it is clear that a mixing in of metal coated graphite will have in consequence a considerably greater conductivity than if there is no such coating.

The galvanoplastic coating in question may be made in the manner described below, with reference to the annexed drawing.

In an ordinary vessel (*a*) such as used for galvanoplastic work containing for instance a common nickel bath, of any well known electrolyte used for nickel plating a basket (*b*) is placed, which consists of a very fine network of nickel and which is in conductory connection with the negative pole of an electric current generator. Into the basket are placed the flakes or crystals of graphite, which, of course, must be large enough not to fall down between the meshes of the net. On the bottom of the vessel there is an anode (*n*) of nickel, which is in conductory connection with the positive pole of the current generator. The nickel has the property of not being acted upon by oxygen in the bath, *i. e.* does not occlude this gas, and the coating is permanent. On the other hand, platinum will occlude oxygen and fall as a slime from the electrodes, and in a short time the conductivity will be greatly decreased. Platinum will also occlude hydrogen which permeates the entire mass of the metal, while with nickel the surface of the plating only is affected by the hydrogen, not the entire mass.

Now, if a feeble electric current is conducted through the bath for some time, the flakes of graphite will gradually get a beautifully shining sheet of nickel. In order to effect the greatest possible uniformity of the nickel-plating, the bath should be stirred ever and anon. The nickelplated graphite obtained in this manner, will of course, have a conductivity many times greater than the one not nickel-plated. The non-conductive oxids or hydrates should then be mixed with this nickelplated graphite and be put between perforated metal plates in the known manner in order to form electrodes. Instead of nickel, any other metal that is indifferent in the electrolyte and that does not occlude oxygen may be used, and instead of graphite any other conductive kind of carbon.

Having now described my invention, what I claim as new, and desire to secure by Letters Patent, is as follows:

1. An electrode for secondary batteries having an alkaline electrolyte, said electrode containing an active mass mixed with small particles of carbon having a thin coating of a metal that does not occlude oxygen and that is insoluble in the electrolyte, substantially as described.

2. An electrode for secondary batteries having an alkaline electrolyte, said electrode containing an active mass mixed with particles of graphite coated with a metal that does not occlude oxygen and that is insoluble in the electrolyte, substantially as described.

3. An electrode for secondary batteries having an alkaline electrolyte, said electrode containing an active mass mixed with flake graphite having a thin coating of a metal that does not occlude oxygen and that is insoluble in the electrolyte, substantially as described.

4. An electrode for reversible secondary batteries having an alkaline electrolyte, said electrode containing an active mass of oxygen compounds of a metal mixed with flake graphite, the particles of which have a thin coating of nickel, said coating and active mass insoluble in the electrolyte, substantially as described.

5. An electrode for reversible secondary batteries having an alkaline electrolyte, said electrode containing a suitable active mass mixed with particles of carbon having a coating of a metal that does not occlude oxygen and that is insoluble in the electrolyte under all conditions of working, substantially as described.

6. An electrode for reversible secondary batteries having an alkaline electrolyte, said electrode containing a suitable active mass mixed with small particles of graphite having a thin coating of a metal that does not occlude oxygen and that is insoluble in the electrolyte under all conditions of working, substantially as described.

7. An electrode for reversible secondary batteries having an alkaline electrolyte, said electrode containing an active mass mixed with particles of crystalline graphite, said particles having a coating of a metal that does not occlude oxygen, and both metal and active mass insoluble in the electrolyte under all conditions of working, substantially as described.

8. An electrode for reversible secondary batteries having an alkaline electrolyte, said electrode containing an active mass of oxygen compounds of a metal mixed with flake graphite, the particles of the graphite coated with nickel, said coating and active mass insoluble in the electrolyte under all conditions of working, substantially as described.

9. An electrode for reversible galvanic batteries having an alkaline electrolyte, said electrode containing an active mass consisting of oxygen compounds of a metal and particles of graphite coated with nickel, the oxygen compounds and the metal insoluble in the alkaline electrolyte, substantially as described.

10. An electrode for reversible secondary batteries having an alkaline electrolyte, said electrode containing an active mass consisting of oxygen compounds of metals and particles of graphite having a plating of a metal thereon, said metal plating not occluding oxygen, and both the oxygen compounds and metal plating insoluble in the electrolyte under all conditions of working, substantially as described.

11. A new product comprising particles of graphite plated with a metal that is insoluble in alkali and that does not occlude oxygen.

12. A new product comprising particles of graphite, nickel plated.

13. A new product comprising nickel-plated flakes of graphite substantially as set forth.

In testimony that I claim the foregoing as my invention, I have signed my name in presence of two subscribing witnesses.

ERNST WALDEMAR JUNGNER.

Witnesses:
  ADOLPF BERGLUND,
  T. BOŸE.